United States Patent [19]

Lévesque et al.

[11] Patent Number: 5,303,051
[45] Date of Patent: Apr. 12, 1994

[54] METHOD FOR REMOVING THE EFFECTS OF PARTICULATE MATTER FROM SEQUENCES IMAGES

[75] Inventors: Martin Lévesque, Loretteville; Auguste Blanchard, Cap-Rouge; Georges R. Fournier, Lac Beauport; Luc J. M. Forand, Ste-Foy, all of Canada

[73] Assignee: Her Majesty the Queen in right of Canada, as represented by the Minister of National Defence of Her Majesty's Canadian Goverment, Ottawa, Canada

[21] Appl. No.: 853,616

[22] Filed: Mar. 18, 1992

[30] Foreign Application Priority Data

May 6, 1991 [CA] Canada .................................. 2041848

[51] Int. Cl.$^5$ .................... H04N 3/14; H04N 5/335; H04N 5/213
[52] U.S. Cl. .................................. 348/31; 348/229; 348/241
[58] Field of Search .............. 358/213.15, 209, 213.18, 358/213.19, 95, 213.11, 228, 167

[56] References Cited

U.S. PATENT DOCUMENTS

| | | | |
|---|---|---|---|
| 4,275,418 | 6/1981 | Trump et al. | 358/167 |
| 4,654,583 | 3/1987 | Ninomiya et al. | 356/394 |
| 4,829,382 | 5/1989 | Hess et al. | 358/228 |
| 4,953,032 | 8/1990 | Suzaki et al. | 358/167 |
| 5,019,908 | 5/1991 | Su | 358/167 |
| 5,021,884 | 6/1991 | Ozaki et al. | 358/167 |
| 5,075,778 | 12/1991 | Saito | 358/228 |

Primary Examiner—Joseph Mancuso
Assistant Examiner—Wendy R. Greening
Attorney, Agent, or Firm—Larson and Taylor

[57] ABSTRACT

Imaging devices often obtain images of a scene in which portions of the scene are obscured by particles that are interposed between the scene and the camera such as those images obtained when looking through falling snow or through particles stirred up by water currents in an underwater domain. An improved system for reducing the effects of those particles on reconstructed images of a scene consists of obtaining a number of images of a scene and replacing missing elements of the scene, which elements are ones obscured by the particles, with corresponding elements of the scene obtained from previous or following images in which those particular elements of the scene are visible. In this manner, a reconstructed image of the scene can be obtained in which the effects of the particles on the image is greatly reduced.

21 Claims, 5 Drawing Sheets

TIME = 6 FRAMETIME

TIME = 5 FRAMETIME

TIME = 4 FRAMETIME 5,303,051

METHOD FOR REMOVING THE EFFECTS OF PARTICULATE MATTER FROM SEQUENCES IMAGES

FIELD OF THE INVENTION

The invention relates to imaging devices wherein the recorded images are partially obscured by particles which are interposed between the scenes and the camera with an improved system for reducing the effect of those particles on reconstructed images of a scene.

BACKGROUND OF THE INVENTION

In many cases, scenes of interest in sequences of images recorded by an imaging device are partially obscured by particles which interpose themselves between the scenes and the camera. The type of imaging devices may be film, television, infra-red, ultra-violet, X-ray, radar or ultra-sound imagers. Typical examples would be images obtained when looking through falling snow or, in the underwater domain, looking through organic particles or other particles stirred up by natural or artificial water currents. The presence of such particles imposes a severe strain on an operator trying to identify or monitor features of the scene as any one who has driven in a snowstorm during the day, or at night with the headlights on, can testify.

Some cameras adjust themselves to the average light level and will, as a result, operate at a gain or sensitivity more appropriate for looking at the particles than at the scene of interest when the particles are numerous enough and when their luminous intensity is substantially different from the scene being observed.

Another problem occurs when an attempt is made to numerically process these type of images since the presence of particles which partially obscure an image severely affects the performance of standard image-processing methods such as those based on the Fourier transform. The presence of those particles introduce high spatial frequency components different from those present in the scene of interest and those components cannot be adequately treated by even the most efficient algorithms.

In a first known method of processing an image, each image is treated separately and the high spatial frequency components associated with the particles are removed by standard filtering techniques such as direct convolution or Fourier transform operations. In a second method, a sequence of images is averaged or filtered using statistical operators until the effect of the particle is sufficiently attenuated. These two methods can be considered to be in the general category of linear processing methods. However, both of these known methods have a number of drawbacks.

In the case of the convolution methods, there are three principal limitations. The most important limitation is that these methods reduce the high frequency components uniformly and therefore the image of the scene is blurred by a corresponding amount. A second limitation is that these methods do not allow the scene, which lies behind the particles, to be observed. These methods also require substantial computational resources in their digital implementation which is a third limitation.

The principal limitation in the case of the averaging method is that of the averaging process itself since the effect of the particles on the image is not eliminated but merely progressively reduced as more images are added together. The process requires many images to be used resulting in loss of time resolution due to the long sequence of images. Furthermore, a definite loss of contrast occurs due to the averaging of light from all the particles in each image uniformly across the screen.

SUMMARY OF THE INVENTION

It is an object of the present invention to provide an improved method of reducing the effects of particles interposed between a scene and an imaging device which avoids limitations of present known methods.

In a sequence of images, according to one embodiment of the present invention, an image in which the scene of interest is partially hidden by particles can be corrected by replacing missing elements of the scene, which elements are obscured by the particles, with corresponding elements from previous or following images in which those elements are visible.

BRIEF DESCRIPTION OF THE DRAWINGS

The following detailed description of the invention will be more readily understood when considered in conjunction with the accompanying drawings, in which.

DESCRIPTION OF THE PREFERRED EMBODIMENTS

The situation in which the scene is not moving with respect to the camera will be considered first and for a particular case in which the particles are known to be much brighter than the scene such as in the case of a snow storm, the snow being illuminated by security lights. A sequence of two or more images is obtained and a minimum value of the signal from corresponding picture elements (pixels) in the images is used as a "valid value" for the signal for that picture element of the scene. The "valid values" for each pixel are than used to construct an image of the scene. In the opposite case, where the particles are much darker than the background, the same technique just described is used with the exception that the maximum value obtained when corresponding pixels are compared in the images is used as a "valid value" for a picture element of that portion of a scene. These type of techniques are illustrated in FIG. 1.

Figure 1C:
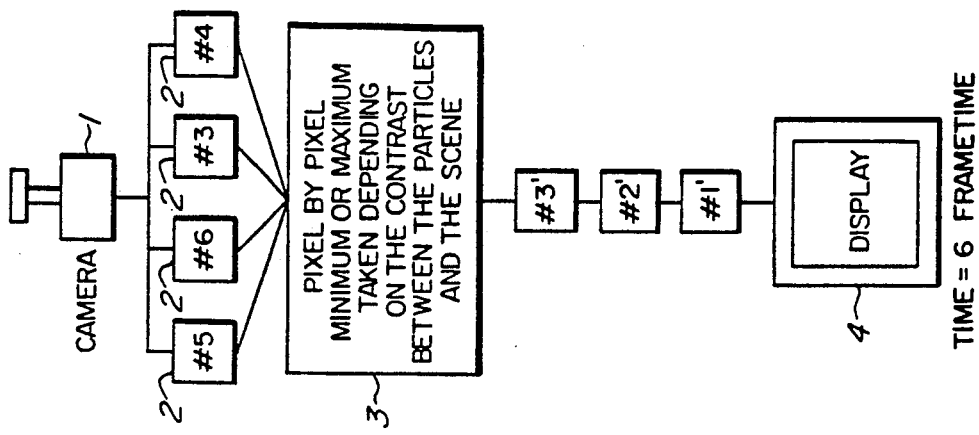
FIGS. 1a, 1b and 1c illustrate one method according to the present invention of reducing the effect of particles between a scene and an imaging device when the brightness of the particles are known to be either brighter or darker than the general brightness of the scene.
Figure 1B:
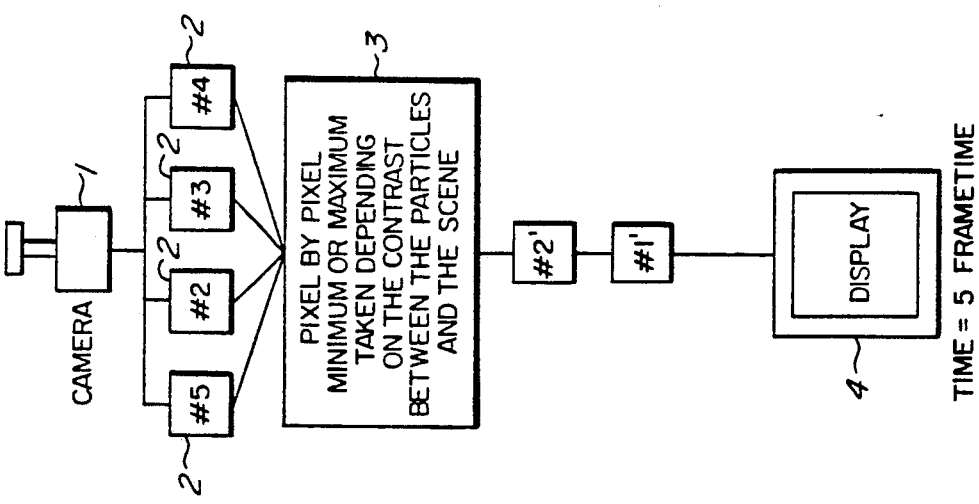
Figure 1A:
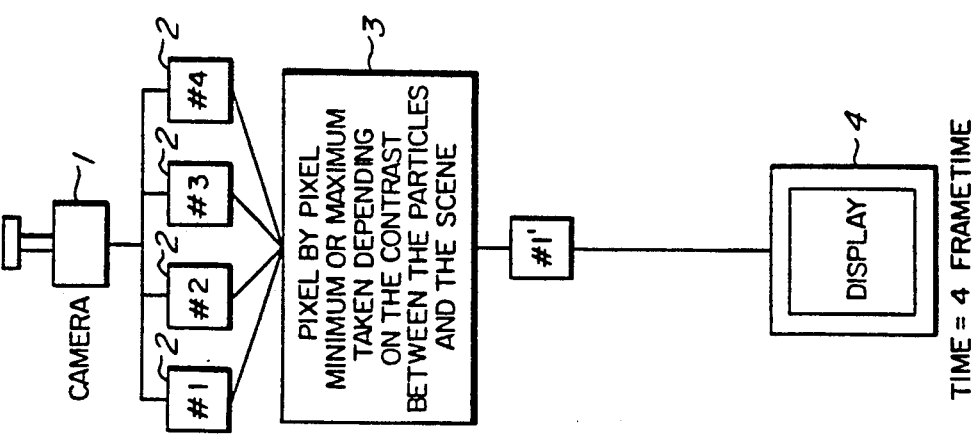

In FIG. 1a, 1b and 1c, camera 1 takes a number of images of a scene in sequence with four images of the scene being temporarily stored in four ring buffers or memories 2. When the particles between the camera 1 and the scene are much brighter than the scene, the four stored images [frame #1, #2, #3 and #4 as shown at FIG. 1(a)] are compared pixel by pixel in circuit 3 and the minimum value obtained for signals from corresponding pixels of the images is taken as being a "valid value" for that elementary portion of the scene. These "valid values" for each portion of the scene are then used as pixels in reconstructing an image of the scene to form a "corrected image" #1' which can then be displayed on a monitor 4 as illustrated in FIG. 1(a).

Assuming that N images are used in the processing by circuit 3, once a new image is obtained by the camera, the oldest image is discarded and the newest image is then stored in the memory 2 which had previously contained the oldest image. This is illustrated in FIG. 1(b) where the fifth image (frame #5) is stored in the memory previously occupied by frame #1, i.e. the oldest image. Then frames #5, #2, #3 and #4 are compared pixel by pixel in circuit 3 with the minimum value of corresponding pixels from each being taken as a "valid value" for that portion of the scene. These new "valid values" for each portion of the scene are then used to form a new "corrected image" #2' which can be displayed by display element 4. When the next image (frame #6) is obtained by camera 1, that image is stored in the memory 2 which had previously stored the oldest frame, which frame is then discarded. The oldest frame in this case would have been frame #2. This is illustrated in FIG. 1(c) where frames #5, #6, #3 and #4 are used to form a newer "corrected image" #3'. In this manner a sequence of "corrected images" can be displayed by display element 4 in a continuous manner.

The number N of images used in the processing for any given case should be sufficient to produce a clear "corrected image" of the scene. This is, of course, dependent on the amount of particles hiding the scene and on the nature of their motion such as when the particles have either a slow or fast motion and whether their motion is random or systematic. The minimum number of images N is two and the ideal maximum is a compromise between achieving sufficient clarity of the scene while preserving an adequate response time to changes in the scene. The more images N used in the processing, the slower the response time will be to changes in the scene. In practice, the number of images N can be varied so that a user can adjust the number of images N in order to achieve the best compromise for any particular situation.

The above description pertained to a case where the particles are much brighter than the background scene. In the opposite case, where the particles are much darker than the background, the same technique can be used with the exception that the maximum value obtained from the pixel by pixel comparison of the latest N images is used as a "valid value" to form a "corrected image" of the scene.

Figure 2A:
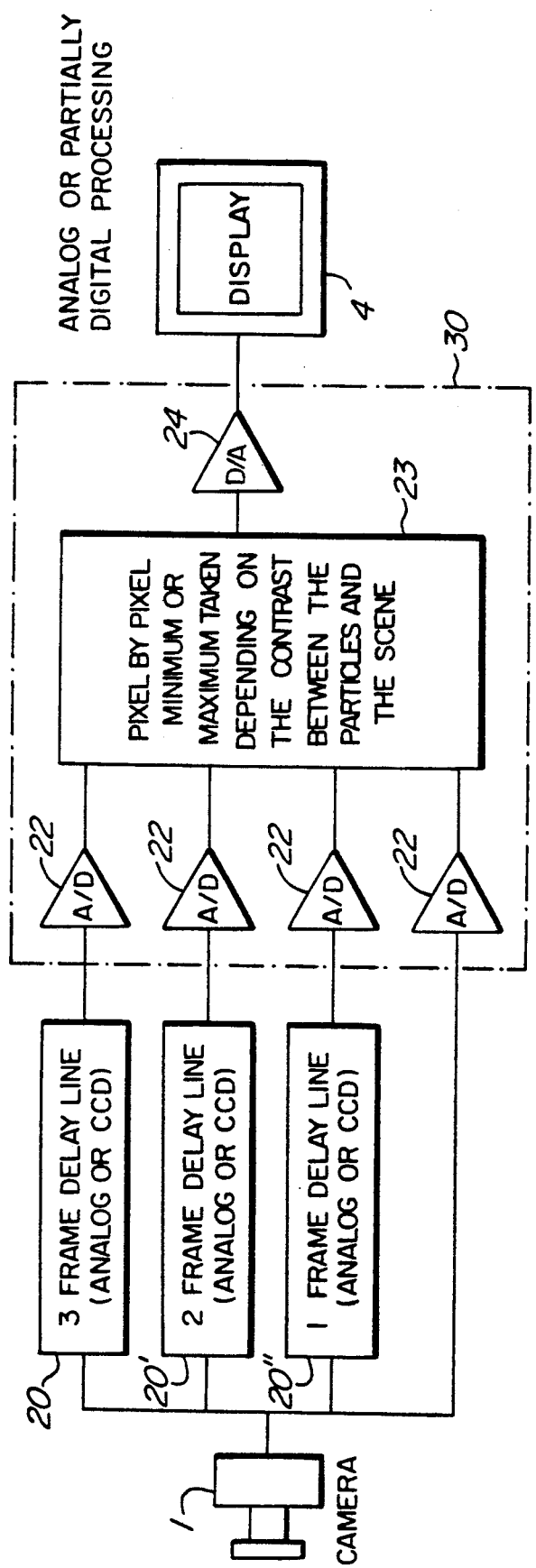
FIGS. 2a and 2b are block diagrams of circuits which can implement methods according to the present invention.
Figure 2B:
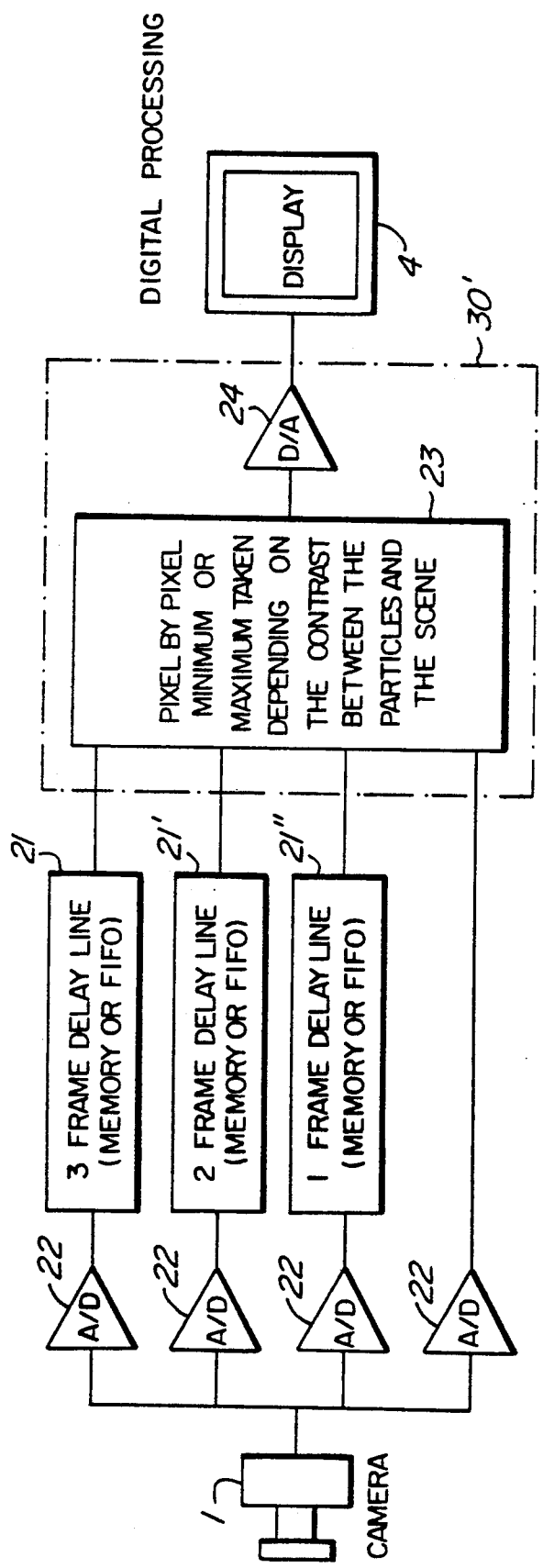

The above methods can be implemented in real time by using relatively inexpensive delay line circuitry and rather simple analog or digital processing as illustrated in FIG. 2 (a) and 2(b) for a case where four images from camera 1 are used in the processing. In FIG. 2 (a), of these four images, the fourth is sent directly to a first analog-to-digital converter (A/D) 22 whose output is applied to a comparison circuit 23. The third image is sent through a one frame delay line 20" to a second A/D converter 22 whose output is applied to circuit 23. The second image is sent through a two frame delay line 20' to a third A/D converter 22 whose output is applied to circuit 23 and the first image is sent through a three frame delay line 20 to circuit 23 via a fourth A/D converter 22. The delays associated with delay lines 20, 20' and 20" must be equal to a multiple of the time between images to within a small fraction of a picture element. In a television camera, this delay would be multiples of the $1/30^{th}$ of a second time between full frames while the precision required would be better than one part in 300,000 of that delay. Any type of delay element may be used as long as it provides the required delay with the required precision. The circuit 23 compares the four frames from A/D converters 22 pixel by pixel and selects the minimum (or maximum) signal value for each pixel which value is then considered as a "valid value" for a pixel for that portion of the scene. The valid values are sent via a D/A converter 24 to a display element 4 to reconstruct and display a "corrected image".

Circuit 30, containing the A/D converters 22, comparison circuit 23 and D/A converter 24 operates the same as element 3 in FIG. 1, the circuit 23 doing the processing in digital form. However, the processing can also be accomplished in analog form in which case the A/D converters and D/A converter can be discarded. FIG. 2 (b) illustrates another embodiment using a digital processor 23 in which the A/D converters 22 are inserted before the delay lines 21, 21' and 21" rather than between the delay lines and the processing circuit 23. In this case the delay lines would be ones that operate in digital form such as FIFO memory chips or charge coupled devices (CCD). The number N of images processed in circuit 23 can be varied by increasing or decreasing the number of operating delay lines and associated circuitry.

Figure 3:
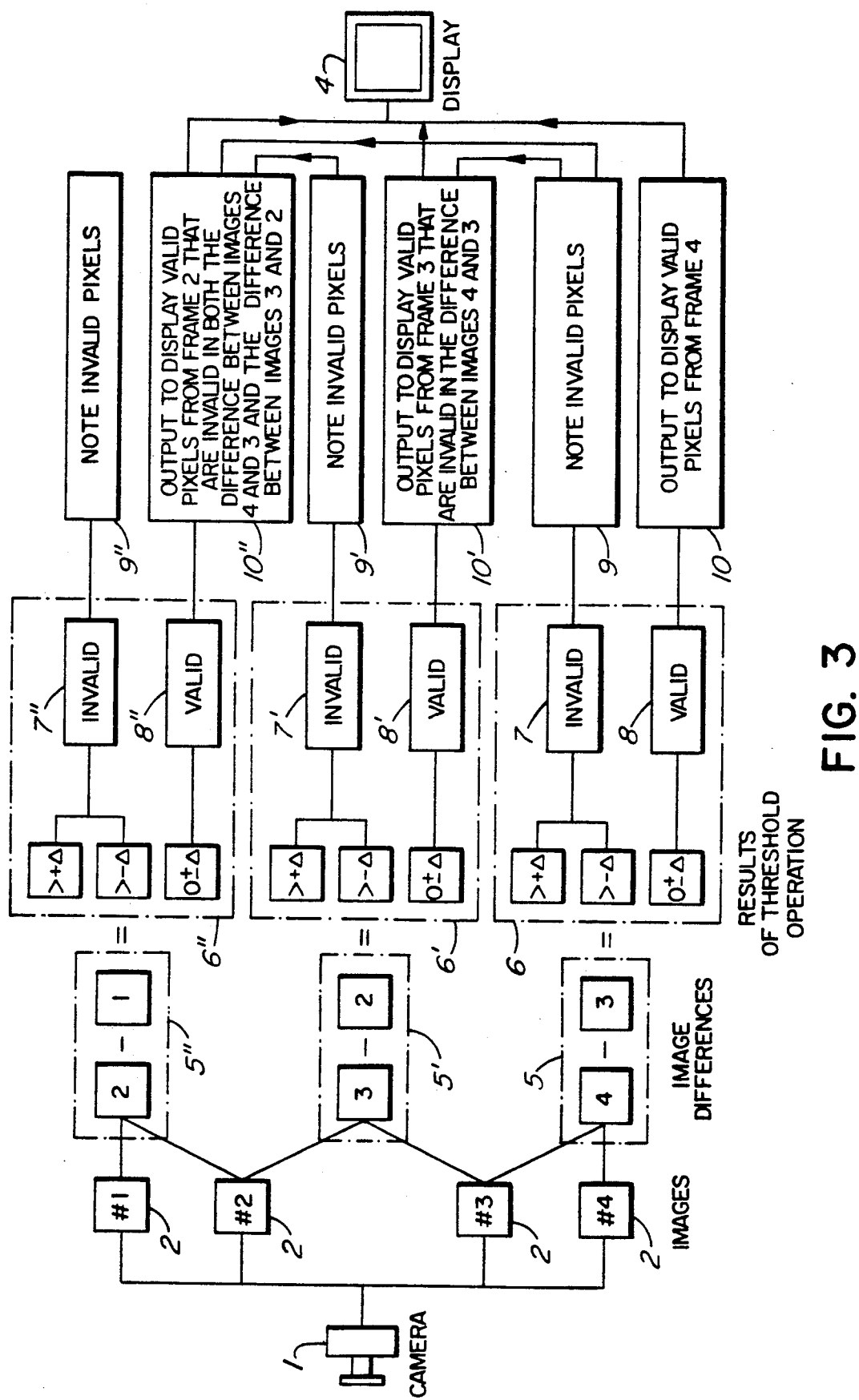
FIG. 3 illustrates another method according to the present invention of reducing the effect of particles between a scene and an imaging device when the contrast between the brightness of the particles and the scene is unknown.

However, it is necessary to use a different approach when it is not known if the particles are brighter or darker than the background or if this contrast between the particles and background varies in different portions of the scene. A circuit to accomplish this is shown in FIG. 3 which again shows a system for processing four images (frames #1, #2, #3 and #4) from camera 1. Sets of differences between successive images are first taken with the processing proceeding from the latest pair to the earlier pairs in order to update the information in as timely a fashion as possible. The difference between corresponding picture elements in frame #4 and #3 is determined by element 5 and the results applied to a threshold device in circuit 6 where it is determined if the absolute difference is between 0 and a predetermined threshold Δ. If the absolute difference does not exceed the predetermined threshold Δ, the picture element in question is deemed to be valid at 8 and is stored at 10 for future presentation. If the difference between a picture element in frame #4 and #3 is greater than ±Δ, this picture element from frame #4 is considered to be invalid at 7. The invalid elements are noted and stored in memory 9. Similarly, the differences between picture elements of frames #3 and #2 are determined at 5' and if it is determined that a picture element of frame #3 is valid by 8', then that element is stored at 10' for future presentation to a display 4. The same process is repeated between frames #2 and #1 with valid picture elements from frame #2 being stored at 10" and invalid picture elements being noted and stored at 9". The noted invalid pixels stored at 9 are checked at 10' and if a valid pixel from frame #3 is found for a picture element this valid pixel is stored for future display. The same procedure is repeated at 10" to determine if there is a valid pixel in frame #2 for a picture element that was considered invalid in both 9 and 9'. Using the other differences between previous images in this manner, invalid picture elements from the latest pair are once again checked and if some of them are now deemed to be valid they are once again stored for presentation to display 4. This process is repeated until all or at least a sufficient number of picture elements have been declared valid at which point they are presented to display 4 which reconstructs a "corrected image" from the "valid values". The process proceeds from the latest pair to the earlier pairs in order to update the information on the scene in as timely a fashion as possible. Some uncertainty can remain in the case of slow moving particles and it may not be possible to decide if a given pixel comes from a particle or the background. Special operators could be used in this type of case using prior knowledge about the properties of the particles such as particle tracking operators and others. These operators would use available known knowledge about properties of the particles.

Figure 4:
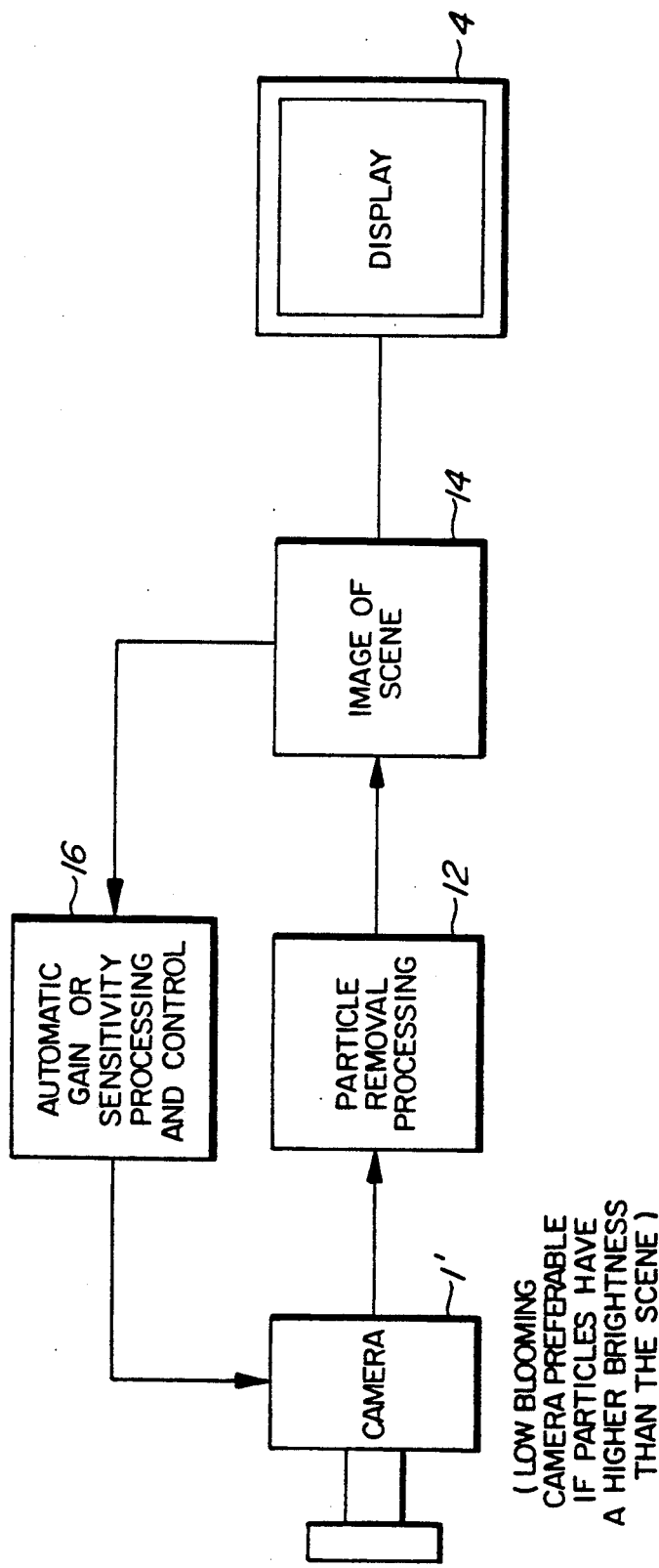
FIG. 4 illustrates a method using the process according to the present invention to improve the images obtained via a low blooming imaging device.

There are many types of imaging devices which have what is known as low or null blooming. This means that the signal intensity in an image is almost independent from picture element to picture element of the image detector. In other words, if a picture element is saturated by an intense signal, the neighbouring picture elements are not significantly affected. A C.I.D. (Charge Injection Device) camera is an example of such a low blooming imaging system. It is possible to considerably improve the performance of these types of camera by using the above methods so as to produce an image of a scene which is virtually devoid of the effects of particles between the camera and scene. It is then possible to manually or automatically adjust the camera's gain or sensitivity to match the level of signal coming from the scene rather than that coming from the particles. This can be accomplished as shown in FIG. 4 by slaving the automatic gain control 16 of camera 1 to the image 14 processed by processor 12 rather than to the raw image from the camera. This technique would allow, for example, the imaging of a dark road, runway or tarmac during a snowstorm with snow falling in the beams from headlights of a car or landing lights of an aircraft. The converse is also true, i.e. allowing the imaging of a bright scene against a foreground of dark particles. In the latter case, the imaging device need not be a low blooming device.

In the case where the camera is moving with respect to the scene, steps must be taken to register the images that are used in the particulate removing process so that each element of the scene is mapped onto the same element in all of the N images used in the processing. This mapping cannot be perfect, as can easily be seen by considering a panning motion since during panning new elements of the scene would appear on one side in each new image and some elements of the scene would disappear on the other side. However, the particle removing process is fully effective for those elements of the scene that remain in view during the N images. Other types of motion such as rotation, zooming, backwards or forwards movement and combinations thereof result in a similar sort of situation as that effected by panning. However, the residual visual effects of the particles that appear at the edges are not particularly objectional to the operator if those motions, such as panning, are slow enough since the zone around the center of the display is the area that is of most interest practically all of the time. The area of the display screen where the particle removal process is not effected or at least less effective is directly related to the speed of motion of the scene on the screen. An element of the scene must be on the screen for N images in order to achieve the full effectiveness of the particle removal process. The limit to the speed of motion of the camera with respect to the scene is set once it is determined how much of the screen must be free of particles. Although compromises can vary from situation to situation, the processes used remain the same. In all cases, the only parameter that can be varied is the number N of images that are used in the particle removing process.

Several techniques are known which can determine the motion of the scene and register a sequence of images. These rest on the fundamental assumption that the scene can be treated as a rigid object over the time of interest. In the present case, this is the time taken to capture N images. These known techniques are all based, implicitly or explicitly, on the concept of correlation. For example, Fourier transform correlation can be used to determine the amount of scene motion in a panning action and Fourier-Bessel correlation can be used for combinations of rotations and pannings. The transforms may be applied to only chosen sub-areas of the scene rather than to the entire scene in order to relieve the computational burden. Standard feature search and pyramidal feature search techniques can also be used as the situation warrants. Image stretching or distortion during zooming forward or backward motion, for example, could be corrected by corner sampling methods. In other words, any method which can determine the image to image motion with sufficient accuracy in real time will suffice. It should be noted that the registration need not be explicitly performed. The particle removal process can be carried out if the pixel to pixel correspondence between images is known and these processes do not require that the image themselves be displaced in the digital memory.

In the case where the process is used to remove the effects of snow in images from fixed surveillance cameras in which no scene motion is involved, the process can be performed using simple delay lines of high precision coupled with a small amount of digital and/or analog processing. The image may also be digitally recorded and processed when the camera is fixed with respect to the scene. However, the images must be digitally recorded and processed in all cases where motion of the camera or the scene is present.

These techniques can be used for fixed surveillance installation, in moving vehicles, aircraft and night-vision equipment. They may also be used underwater to remove the effects on images of large marine particles of biological or mineral origin.

Various modifications may be made to the preferred embodiments without departing from the spirit and scope of the invention as defined in the appended claims. For instance, although the method has been described with respect to a time sequence of images by a camera, the process itself can operate on any type of signal such as electrical, magnetic, electromagnetic, sound, pressure, etc. The examples mentioned are by no means the only situations in which the described processes can be used but give a glimpse of the potential usefulness of the processes.

We claim:

1. A system for removal of effects on images of a scene of moving particulate matter interposed between an imaging device and that scene, wherein a sequence of images is obtained by the imaging device and the system comprises means for determining differences between signal values for each pixel in one image and signal values for corresponding pixels in a following image of the scene in the sequence by comparing images in the sequence pixel-by-pixel, processing means for selecting a valid value for each pixel from said differences and means for reconstructing a corrected image from said valid values, wherein signal values for corresponding pixels imaging a portion of the scene in said sequence of images have a maximum and a minimum value forming two signal values, said valid value for a pixel imaging that portion of the scene in the corrected image being selected from one of said two signal values.

2. A system as defined in claim 1, wherein a minimum signal value obtained for corresponding pixels from images of the scene in the sequence is considered as the valid value for a pixel imaging that portion of the scene in the corrected image.

3. A system as defined in claim 1, wherein a maximum signal value obtained for corresponding pixels from images of the scene in the sequence is considered as the valid value for a pixel imaging that portion of the scene in the corrected image.

4. A system as defined in claim 1, wherein the imaging device is a camera which takes a sequence of N images for processing and said means to determine differences between signal values is a comparator in which the images are compared pixel-by-pixel with the $N^{th}$ image being applied directly to the comparator and the remaining $N-1$ images are applied to the comparator through delay elements.

5. A system as defined in claim 1, wherein the imaging device is a video camera which takes a sequence of n images for processing and a $n^{th}$ image is one of the images in said sequence and wherein said means for determining differences between signal values comprises a comparator in which the images are compared pixel-by-pixel with the $N^{th}$ image being applied directly to the comparator, a first image being applied to the comparator through a $(N-1)$ frame rate of the video camera delay element with each $n^{th}$ image being applied to the comparator through a $(N-n)^{th}$ frame rate delay element.

6. A system as defined in claim 1, wherein the imaging device comprises a video camera which takes a sequence of N images for processing and a $n^{th}$ image is one of the images in said sequence and wherein said means for determining differences between signal values comprises a comparator in which the images are compared pixel-by-pixel with the $N^{th}$ image being applied directly tot he comparator, a first image being applied to the comparator through a $(N-1)$ frame rate of the video camera delay element with each $n^{th}$ image being applied to the comparator through a $(N-n)^{th}$ frame rate delay element, the delay elements comprising high precision delay lines.

7. A system as defined in claim 1, wherein the imaging device comprises a video camera which takes a sequence of N images for processing and a $n^{th}$ image is one of the images in said sequence and wherein said means for determining differences between signal values comprises a comparator in which the images are compared pixel-by-pixel with the $N^{th}$ image being applied directly to the comparator, a first image being applied to the comparator through a $(N-1)$ frame rate of the video camera delay element with each $n^{th}$ image being applied to the comparator through a $(N-n)^{th}$ frame rate delay element, the delay elements comprising FIFO memory devices.

8. A system as defined in claim 1, wherein the imaging device comprises a video camera which takes a sequence of N images for processing and a $n^{th}$ image is one of the images in said sequence and wherein said means for determining differences between signal values comprises a digital comparator in which the images are compared pixel-by-pixel and said signal value which is farthest removed from an average signal value for corresponding pixels is determined with the $N^{th}$ image being applied through an A/D converter directly to the comparator, a first image being applied to the comparator through a $(N-1)$ frame rate of the video camera delay element and an A/D converter with each $n^{th}$ image being applied to the comparator through a $(N-n)^{th}$ frame rate delay element and an associated A/D converter, said signal value which is further removed from an average signal value from the comparator being applied through a D/A converter to a display device.

9. A system as defined in claim 1, wherein the imaging device comprises a video camera which takes a sequence of N images for processing and a $n^{th}$ image is one of the images in said sequence and wherein said means for determining differences between signal values comprises a digital comparator in which the images are compared pixel-by-pixel and said signal value which is farthest removed from an average signal value for corresponding pixels is determined with the $N^{th}$ image being applied through an A/D converter directly to the comparator, a first image being applied to the comparator through an A/D converter and a $(N-1)$ frame rate of the video camera delay element with each $n^{th}$ in age being applied to the comparator through an associated A/D converter and a $(N-n)^{th}$ frame rate delay element, said signal value which is farthest removed from an average signal value from the comparator being applied through a D/A converter to a display device.

10. A system as defined in claim 1, wherein the imaging device comprises a video camera which takes a sequence of n images for processing and a $n^{th}$ image is one of the images in said sequence and wherein said means for determining differences between signal value comprises a digital comparator in which the images are compared pixel-by-pixel and said signal value which is farthest removed from an average signal value for corresponding pixels is determined with the $N^{th}$ image being applied through an A/D converter directly to the comparator, a first image being applied to the comparator through an A/D converter and a $(N-1)$ frame rate of the video camera delay element with each $n^{th}$ image being applied to the comparator through an associated A/d converter and a $(N-n)^{th}$ frame rate delay element, said signal value which is farthest removed from an average signal value from the comparator being applied through a D/A converter to a display device, the delay elements comprising charge coupled devices.

11. A system as defined in claim 1, wherein the imaging device comprises a video camera which takes a sequence of N images for processing and a $n^{th}$ image is one of the images in said sequence and wherein said means for determining differences between signal values comprises a digital comparator in which the images are compared pixel-by-pixel and said signal value which is farthest removed from an average signal value for corresponding pixels is determined with the $N^{th}$ image being applied through an A/D converter directly to the comparator, a first image being applied to the comparator through an A/D converter and a (N−1) frame rate of the video camera delay element with each $n^{th}$ image being applied to the comparator through an associated A/d converter and a $(N−n)^{th}$ frame rate delay element, said signal value which is farthest removed from an average signal value from the comparator being applied through a D/A converter to a display device, the delay elements comprising FIFO memory devices.

12. A system as defined in claim 1, wherein the imaging device is provided with an automatic gain control whose input is connected to an output of the processing means.

13. A system as defined in claim 1, wherein the imaging device is a low blooming imaging system with an automatic gain control whose input is connected to an output of the processing means.

14. A system as defined in claim 1, wherein the imaging device is a charge injection device (C.I.D.) camera with an automatic gain control whose input is connected to an output of the processing means.

15. A system as defined in claim 1, wherein a means is included to register the images so that elements of the scene in an image are mapped onto corresponding elements in other images in the sequence.

16. A method for removing effects on images of a scene of moving particulate matter interposed between an imaging device and that scene, wherein the imaging device takes a sequence of N images for processing in which the signal values of pixels in the next to last image are subtracted from signal values of corresponding pixels in the last image in a subtractor to provide difference signals which are applied to a threshold circuit to determine if the absolute values of the difference signals are equal to or less than a predetermined threshold value in which case the signal value for those pixels is considered as being valid and is stored in a memory for output to a display device, the remaining difference signals whose absolute value is greater than the threshold value, thereby indicating that the signal values for those pixels are invalid being noted and stored in a further memory, each of the signal values for pixels in the remaining images being subtracted from signal values for pixels in the next image in further subtracters to select valid and invalid signal value for the pixels which valid values are stored in memories, each of the invalid noted signal values being stored and checked with stored signals in earlier images to determine if a valid signal for that pixel exists in an earlier image, the method processing from the latest pair of images to earlier pairs of images in order to update the information with a display device displaying an image from the stored valid values for the pixels once a sufficient number of the values has been determined to be valid.

17. A system for removal of effects on images of a scene of moving particulate matter interposed between an imaging device and that scene, wherein a sequence of images is obtained by the imaging device and the system comprises means for determining differences between signal values for each pixel in one image and signal values for corresponding pixels in a following image of the scene in the sequence by comparing images in the sequence pixel-by-pixel, processing means for selecting a valid value for each pixel from said differences and means for reconstructing a corrected image from said valid values, said differences being obtained by subtracting a signal value for each pixel in one image from a signal value for a corresponding pixel in a following image of the scene in the sequence to obtain a difference signal which is compared with a predetermined threshold value and only signals having values such that said difference signal is less than said predetermined threshold value being considered as valid values.

18. A system as defined in claim 17, wherein the imaging device is provided with an automatic gain control whose input is connected to an output of the processing means.

19. A system as defined in claim 17, wherein the imaging device is a low blooming imaging video camera with an automatic gain control whose input is connected to an output of the processing means.

20. A system as defined in claim 17, wherein the imaging device is a C.I.D. camera with an automatic gain control whose input is connected to an output of the processing means.

21. A system as defined in claim 17, wherein a means is included to register the images so that elements of the scene in an image are mapped onto corresponding elements in other images in the sequence.

* * * * *